US008977881B2

(12) United States Patent
Lopez-Aguado et al.

(10) Patent No.: US 8,977,881 B2
(45) Date of Patent: Mar. 10, 2015

(54) CONTROLLER CORE TIME BASE SYNCHRONIZATION (75) Inventors: Herbert Lopez-Aguado, Sunnyvale, CA (US); Jung Wook Cho, Cupertino, CA (US); Conrad H. Ziesler, Seattle, WA (US)

(73) Assignee: Apple Inc., Cupertino, CA (US)

( * ) Notice: Subject to any disclaimer, the term of this patent is extended or adjusted under 35 U.S.C. 154(b) by 782 days.

(21) Appl. No.: 13/208,669

(22) Filed: Aug. 12, 2011

(65) Prior Publication Data

US 2013/0042135 A1   Feb. 14, 2013

(51) Int. Cl.
*G06F 1/12* (2006.01)

(52) U.S. Cl.
CPC .......................................... *G06F 1/12* (2013.01)
USPC ............ 713/400; 713/401; 713/402; 713/500

(58) Field of Classification Search
CPC ............... G06F 1/12; G06F 1/14; G06F 1/10; G06F 5/06; G11C 7/22
USPC .................................. 713/400, 401, 402, 500
See application file for complete search history.

(56) References Cited

U.S. PATENT DOCUMENTS

| | | | |
|---|---|---|---|
| 5,572,211 A * | 11/1996 | Erhart et al. ................... | 341/144 |
| 6,968,473 B2 | 11/2005 | Kriz et al. | |
| 7,058,838 B2 | 6/2006 | Xu | |
| 7,194,648 B2 | 3/2007 | Heinrich et al. | |
| 7,715,559 B2 * | 5/2010 | Rainbolt et al. ............... | 380/225 |
| 2002/0169993 A1 * | 11/2002 | Woods et al. .................. | 713/400 |
| 2007/0076787 A1 * | 4/2007 | Miller et al. ................... | 375/149 |
| 2009/0292913 A1 * | 11/2009 | Kune et al. ..................... | 713/150 |
| 2010/0005332 A1 | 1/2010 | Simon et al. | |
| 2010/0064163 A1 * | 3/2010 | Choi et al. ..................... | 713/401 |
| 2011/0047315 A1 | 2/2011 | De Dinechin et al. | |

* cited by examiner

*Primary Examiner* — Zahid Choudhury
(74) *Attorney, Agent, or Firm* — Rory D. Rankin; Meyertons, Hood, Kivlin, Kowert & Goetzel, P.C.

(57) ABSTRACT

A system and method for efficiently synchronizing multiple processing cores on a system-on-a-chip (SOC). A SOC includes an interrupt controller and multiple processing cores. The interrupt controller includes a main time base counter. The SOC includes multiple local time base counters, each coupled to a respective one of the processing cores. Synchronization logic blocks are used to update the local counters. These blocks receive a subset of bits from the interrupt controller. The subset of bits represents a number of least significant bits of the main counter less than a total number of bits for the main counter. The logic blocks update an associated local counter according to changes to the received subset of bits. A difference may exist between values of the main counter in the interrupt controller and the local counter in the processing core. However, this difference may be a constant value.

24 Claims, 9 Drawing Sheets

CONTROLLER CORE TIME BASE SYNCHRONIZATION

BACKGROUND OF THE INVENTION

1. Field of the Invention

This invention relates to computing systems, and more particularly, to efficiently synchronizing multiple processing cores on a system-on-a-chip (SOC).

2. Description of the Relevant Art

A system-on-a-chip (SOC) integrates multiple functions into a single integrated chip substrate to meet increasing processing demands of embedded system applications. The functions may include digital, analog, mixed-signal and radio-frequency (RF) functions. An SOC may use powerful processors that execute operating system (OS) software. In addition, the SOC may utilize hardware accelerators for digital signal processing (DSP) kernels, high-performance DSP cores, graphics processing units (GPUs), other single instruction multiple data (SIMD) cores and other proprietary processing cores. Further, the SOC may be connected to both external memory chips, such as Flash or RAM, and various external peripherals. Energy-constrained cellular phones, portable communication devices and entertainment audio/video (A/V) devices are some examples of systems using an SOC.

While executing applications, the various processor cores on the SOC may share system memory, buses and peripherals. In order to preserve system integrity, methods and mechanisms providing synchronization between the various processing cores and devices may be used. However, one or more of the cores or devices may lack multiprocessor synchronization support.

Additionally, the SOC may support 64-bit computing to meet modern demands for embedded systems. Although most desktops support 32-bit computing, most supercomputers, servers and other bigger systems utilize 64-bit computing, which is capable of addressing more memory. More memory may significantly improve performance of executing applications, such as those running in an embedded system. A synchronization scheme for a 64-bit SOC may utilize a 64-bit time base counter. Providing a 64-bit copy of this time base counter to each of the processing cores on the SOC consumes on-die real-estate with wire routes and storage elements for each of the processing cores. Further, as integration increases on a SOC, so does a number of different active clocks and a number of phase lock loops (PLLs) to support the clocks. These active clocks may operate at different frequencies from one another and from the source 64-bit time base counter.

In view of the above, efficient methods and mechanisms for synchronizing multiple processing cores on a system-on-a-chip (SOC) are desired.

SUMMARY OF EMBODIMENTS OF THE INVENTION

Systems and methods for efficiently synchronizing multiple processing cores on a system-on-a-chip (SOC) are contemplated. In one embodiment, an SOC includes an interrupt controller and multiple processing cores. The interrupt controller includes a main counter which may be used as a time base counter for the SOC. The SOC also includes one or more local counters, each coupled to a respective one of the processing cores. Additionally, the SOC includes synchronization logic blocks. In various embodiments, each of these logic blocks may receive a subset of bits of the time base counter from the interrupt controller. For example, the subset of bits may represent a number of least significant bits of the main counter. Alternatively, the received subset of bits may be an encoding of selected bits of the main counter. For example, a Gray code may be used to encode the subset of bits. In such embodiments, less than the entire time base value is sent to the processing cores.

Embodiments are also contemplated in which each of the synchronization logic blocks may utilize a synchronizer and a decoder. The received subset of bits may be synchronized to a clock frequency of a respective processing core. Both this clock frequency and an associated operating voltage for the processing core may be different from a clock frequency and operating voltage used by the interrupt controller and the main counter. In response to receiving a subset of bits of the main counter, the synchronization logic block may update an associated local counter to reflect changes in the main counter represented by the received subset of bits.

These and other embodiments will be further appreciated upon reference to the following description and drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Figure 1:
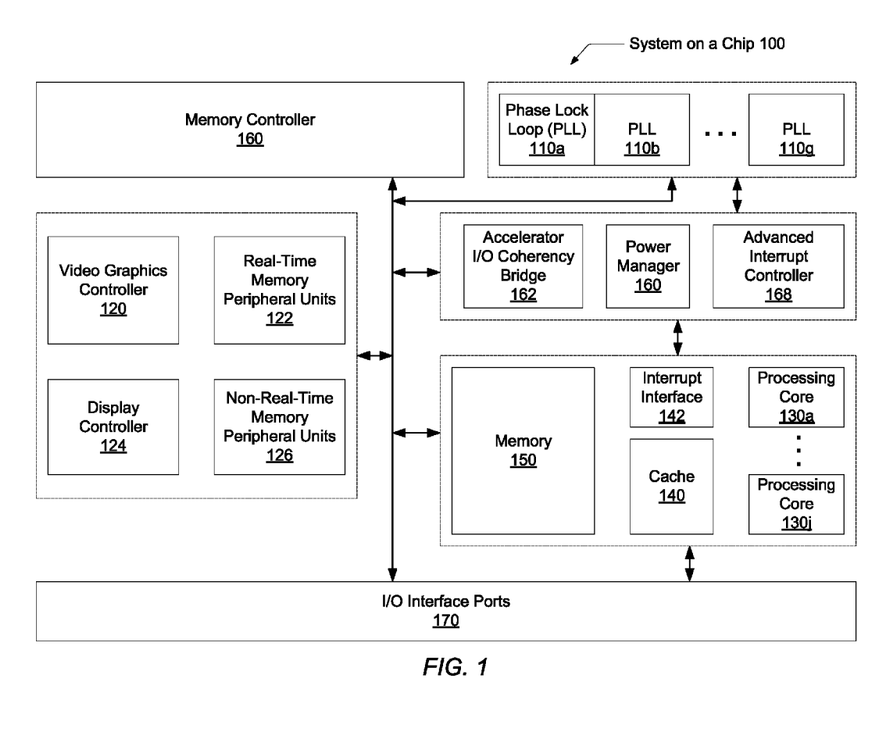
FIG. 1 is a generalized block diagram of one embodiment of a system-on-a-chip (SOC).

Referring to FIG. 1, a generalized block diagram illustrating one embodiment of a system-on-a-chip (SOC) 100 is shown. The SOC 100 is an integrated circuit (IC) that includes multiple types of IC designs on a single semiconductor die, wherein each IC design provides a separate functionality. Traditionally, each one of the types of IC designs may have been manufactured on a separate silicon wafer. In the illustrated embodiment, the SOC 100 includes one or more clock sources, such as phase lock loops (PLLs) 110a-110g, a memory controller 160, various input/output (I/O) interfaces 170, a memory 150, which may be a non-volatile memory, and one or more processing cores 130a-130j with a supporting cache hierarchy that includes at least cache 140.

In addition, the SOC 100 may include other various analog, digital, mixed-signal and radio-frequency (RF) blocks. For example, the SOC 100 may include a video graphics controller 120, a display controller 124, real-time peripheral memory units 122 and non-real-time memory peripheral units 126. In order to process applications in an energy-efficient manner on the SOC 100, a central power manager 160 may be included.

The PLLs 110a-110g may supply source clock signals, which are routed through a clock tree (not shown) to be distributed across the die of the SOC 100 and to provide core clocks to the various processing cores on the SOC 100. As used herein, a processing core may generally be any of a variety of circuits and/or devices operable to utilize a provided clock. The SOC 100 may use one or more types of PLLs to generate the source clocks signals. For example, an integer PLL may be used. Alternatively, a fractional PLL may be used to generate multiple clock signals with different clock frequencies from a single clock crystal.

A clock control unit may be included within the power manager 160 or alternatively be a separate control block. This clock control unit may update associated circuitry with parameter values within a clock switching network (CSN). The CSN may also be referred to as a clock tree. Communication buses, a clock tree and other signal routing across the SOC 100 is not shown for ease of illustration. The clock control unit may enable and disable given clock generating gates within the clock tree. The number of clock signals provided on the SOC 100 is a design choice and may depend on a number of clocks signals used by the processing blocks on the SOC 100. As integration on the SOC 100 increases, so does the number of clock signals to source and to route. The accelerator I/O coherency bridge 162 may provide efficient memory accesses for at least the processing cores 130a-130j and peripheral devices.

An advanced interrupt controller (AIC) 168 may be used to manage interrupts in the SOC 100. The AIC 168 may be a programmable interrupt controller. Interrupt management may be complex in an embedded system such as the SOC 100. The SOC 100 may include general-purpose processors, specific Intellectual Property (IP) cores, off-of-the-shelf cores, single instruction multiple data (SIMD) cores, such as graphics processing units (GPUs); digital signal processors (DSPs), and so forth. The AIC 168 may be used to interface these cores with one another and with peripherals and to allow associated software threads to interact.

Interrupts may be used to synchronize different functionalities and work performed by the multiple cores on the SOC 100 and to allow reactions to external events with real-time constraints. The AIC 168 may provide a number of priority levels to be used to handle incoming priorities. Interrupt sources may be programmed to be level sensitive or edge triggered. In one embodiment, the power manager 160 is unable to power down the AIC 168. However, the AIC 168 may be used to produce an interrupt to notify the power manager 160 to wake up a given processing core on the SOC 100. In one embodiment, the AIC 168 includes an interrupt vector table that stores addresses corresponding to interrupt service routines. These routines may be stored elsewhere on the SOC 100.

The AIC 168 may include multiple timers and counters. A timer may be used to schedule the triggering of events at a point in time in the future. A counter may be used to measure the passing of time. Each of the processing cores within the SOC 100 may use a uniform view of time. In one embodiment, each of the processing cores and peripherals within the SOC 100 reads a common counter. For example, the AIC 168 may include a time base counter that may be read by other processing cores and peripherals. The time base counter within the AIC 168 may be a real-time counter.

The time base counter within the AIC 168 may run during each level of power down modes other than the SOC 100 being turned off. The time base counter may begin counting from a value of zero. The size of the time base counter may be large enough to avoid rollover issues. For example, a 64-bit counter running at 50 MHz would roll over in 11.7 thousand years. A 56-bit counter running at 50 MHz would roll over in 46 years. A 48-bit counter running at 50 MHz would roll over in 2 months, which may be too soon for some applications. Therefore, a limit may be reached in a design trade-off between avoiding rollover issues and reducing on-die real-estate and power consumption to support a number of storage elements and wire routing for reading the time base counter.

The time base counter within the AIC 168 may be set and reset as to whether a user level of privilege is able to directly read the time base. If the SOC 100 supports virtualization, then a hypervisor may be able to apply an offset within a virtual machine to the time base counter value that is read. This offset may allow support for virtual time. When the SOC 100 is halted for debug purposes, the time base counter may also be halted.

Each of the processing cores within the SOC 100 may have a local time base counter. The time base counter within the AIC 168 may be referred to as a main time base counter. The multiple local time base counters may be synchronized with the main time base counter in the AIC 168. For example, each of the processing cores may include synchronization logic blocks to synchronize a respective local time base counter with the main time base counter. Alternatively, the interrupt interface block 142 may include the local time base counters and the synchronization logic blocks. Some off-of-the-shelf processing cores and other cores may not already include the synchronization blocks and/or the local time base counters. The interrupt interface block 142 may be included in a system controller, a bus interface unit or other control block. Although the interrupt interface block 142 is shown logically in one location, the logic, counters and storage elements within this block may be located throughout the die of the SOC 100.

Rather than transmit the entire number of bits within the main time base counter to the multiple processing cores or the interrupt interface block 142, in one embodiment a subset of the main time base counter may be transmitted. For example, a subset of 8 least-significant bits of a 64-bit main time base counter may be sent to the multiple processing cores and/or the interrupt interface block 142. Each change in the main time base counter may occur within one or more bits in the chosen number of least-significant bits of the main time base counter.

To remain synchronized with the main time base counter, a difference may exist between the main time base counter within the AIC 168 and each of the multiple local time base counters as long as the difference is constant. Therefore, the entire size of the main time base counter may not be transmitted to the multiple processing cores and/or the interrupt interface block 142. Both power consumption and on-die real-estate for storage elements and wire routing may be saved.

In addition, one or more of the local time base counters may operate with a different operating state than the main time base counter. The operating state may include an operational supply voltage and an operational clock frequency. A given local time base counter may operate at a higher clock frequency than the main time base counter with no limit to a speedup ratio. However, a given local time base register may have a limit for slow down ratio compared to the main time base register. The number of bits chosen to be in the transmitted subset may set this limit. For example, an 8-bit subset of bits may limit a local time base counter to operate with a clock frequency 255 ($2^8$) times slower than a clock frequency for the main time base counter. Further, synchronization logic blocks may disable one or more updates of a local time base counter in order to reduce power consumption. Therefore, the precision of the synchronization of an associated local time base counter may be traded for reduced energy consumption. Further details of the features of the time base synchronization mechanisms are provided later in the description. Before continuing with more details of the time base synchronization within the SOC, a further description of the SOC 100 is provided below.

The central power manager 160 may be included in a general system controller (not shown). A general system controller may manage power-up sequencing of the various processing cores on the SOC 100 and control multiple off-chip devices via reset, enable and other signals conveyed through the I/O interface ports 170. A general system controller may also manage communication between the various processing cores on the multiple buses on the SOC 100. The power manager 160 may include power management policies for multiple IC devices on the SOC 100. One or more of the IC devices, such as the processing cores 130*a*-130*j*, GPUs, DSPs, other SIMD cores, and so forth may include internal power management techniques. However, to manage system-wide energy consumption, the power manager 160 may alter one or more operating voltages and operating frequencies to the processing cores on the SOC 100.

Each one of the processing cores 130*a*-130*j* may include one or more levels of a cache memory subsystem. Each general-purpose processing core may support the out-of-order execution of one or more threads of a software process and include a multi-stage pipeline. Each one of these general-purpose processing cores may include circuitry for executing instructions according to a predefined general-purpose instruction set. For example, the PowerPC® instruction set architecture (ISA) may be selected. Alternatively, the x86, x86-64®, Alpha®, MIPS®, PA-RISC®, SPARC® or any other instruction set architecture may be selected.

Generally speaking, each of the general-purpose processing cores accesses an on-die level-one (L1) cache within a cache memory subsystem for data and instructions. These general-purpose processing cores may include multiple on-die levels (L2, L3 and so forth) of caches. If a requested memory block is not found in the on-die caches or in the off-die cache 140, then a read request for the missing block may be generated and transmitted to the memory 150. The memory 150 may be a non-volatile memory block formed from an array of flash memory cells and a memory controller (not shown) for the array. Alternatively, the memory 150 may include other non-volatile memory technology. The memory 150 may be divided into separate addressable arrays to be used by the processing cores 130*a*-130*j* and devices located elsewhere on the SOC 100. Each addressable array may have its own memory controller. The number of data inputs and outputs and address inputs will depend on the size of the array used.

General-purpose processing cores may share the memory 150 with other processing cores, such as graphics processing units (GPUs), application specific integrated circuits (ASICs), other SIMD cores and other types of processing cores. Therefore, typical SOC designs utilize acceleration engines, or accelerators, to efficiently coordinate memory accesses and support coherency designs between processing blocks and peripherals. In a SOC designs that includes multiple processing cores, these components communicate with each other to control access to shared resources. Memory coherence may be managed in software, in the accelerator I/O coherence bridge 162, or both. The bridge 162 may also connect low-bandwidth, direct memory access (DMA)-capable 10 devices to the memory 150 via an accelerator coherency port (ACP) on one or more of the processors 130*a*-130*d*. For off-chip memory requests, the memory controller 160 may be utilized.

The SOC 100 may be a heterogeneous system. The multiple processing cores on the SOC 100 may not be a mirrored silicon image of one another or include a similar type of processing architecture. The general-purpose processing cores may have a micro-architecture for executing instructions in a general-purpose ISA. The video graphics controller 120 may include one or more GPUs for rendering graphics for games, user interface (UI) effects, and other applications.

The display controller 124 may include analog and digital blocks and digital-to-analog converters (DACs) for bridging internal blocks to external display physical blocks. The units 122 may group processing blocks associated with real-time memory performance for display and camera subsystems. The units 122 may in clued image blender capability and other camera image processing capabilities as is well known in the art. The units 122 may include display pipelines coupled to the display controller 124.

The units 126 may group processing blocks associated with non-real-time memory performance for image scaling, rotating, and color space conversion, accelerated video decoding for encoded movies, audio processing and so forth. The units 122 and 126 may include analog and digital encoders, decoders, and other signal processing blocks. The I/O interface ports 170 may include interfaces well known in the art for one or more of a general-purpose I/O (GPIO), a universal serial bus (USB), a universal asynchronous receiver/transmitter (uART), a FireWire interface, an Ethernet interface, an analog-to-digital converter (ADC), a DAC, and so forth.

Figure 2:
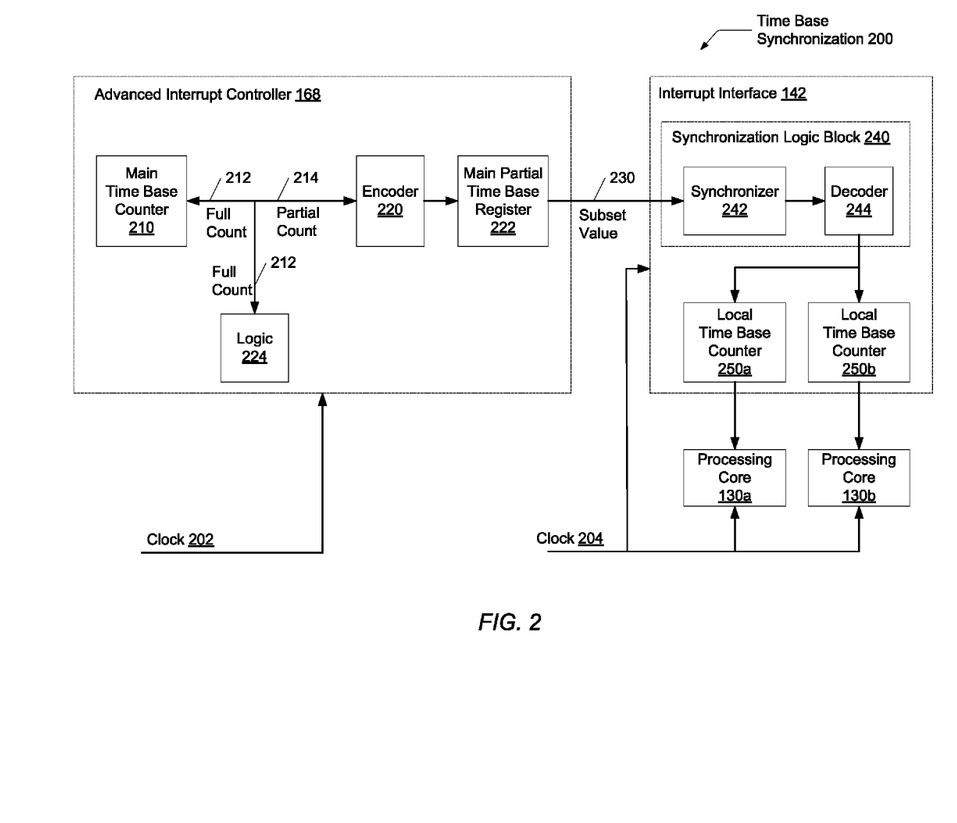
FIG. 2 is a generalized block diagram illustrating one embodiment of time base synchronization.

Turning now to FIG. 2, a generalized block diagram illustrating one embodiment of time base synchronization 200 is shown. The AIC 168 may include a main time base counter 210. Each bit of the main time base counter 210 may be conveyed to logic 224. The full count value 212 includes each bit of the main time base counter 210. The logic 224 may include wake up logic for processing cores, for setting timer values for given events, for interfaces corresponding to external interrupt sources, for interfaces corresponding to software such as a kernel of an operating system (OS), for interfaces corresponding to memory for memory mapped read operations of the time base value, and so forth.

A partial count value 214 may be conveyed to an encoder 220. The partial count value 214 may include a number of least-significant bits of the value of the time base counter 210, wherein this number is less than the entire size of the main time base counter 210. For example, the size of the full count 212 of the time base counter 210 may be 64 bits. The partial count 214 may include the least-significant 8 bits of the main time base counter 210 value. Therefore, the SOC 100 may use a smaller number of combinatorial logic gates, wire routes and storage elements for transmitting and processing the main time base value for synchronizing multiple processing cores.

The encoder 220 may encode the partial count 214. This encoding may be used for preventing glitches, for error detection, for error correction, and so forth. In one embodiment, the Gray code may be used for encoding the partial count 214. Without encoding, the partial count 214 may not change states in synchrony. During a transition between two states, the partial count 214 may provide one or more spurious values. Since a sequential system receives the partial value 214, this system may receive a false value for an appreciable amount of time and glitches may occur. The encoded value of the partial count 214 may be stored in a register, such as the main partial time base register 222. The resulting subset of bits 230 may be conveyed to one or more processing cores via the interrupt interface 142. The main time base counter 210, the main partial time base register 222 and the logic 224 may use the clock signal 202 for synchronizing work and for any pipelines. In one embodiment, the AIC 168 utilizes a different clock signal than the components within the interrupt interface 142. The interrupt interface 142 may use clock signal 204, which may have a different clock frequency than clock 202.

A synchronization logic block 240 within the interrupt interface 142 may receive the subset of bits 230. The synchronization logic block 240 may include a synchronizer 242 and a decoder 44. The synchronizer 242 may include one or more registers used to synchronize the received subset of bits 230 with a clock frequency of clock 204. This clock frequency may be a same clock frequency used by associated processing cores, such as cores 130*a*-130*b* in the illustrated embodiment.

The decoder 244 may decode a stored version of the subset of bits 230. For example, the decoder 244 may decode a value encoded with the Gray code. Other encodings and associated decoding logic is possible and contemplated.

A synchronized and decoded subset of bits may be used to update one or more local time base counters, such as counters 250*a*-250*b* in the illustrated embodiment.

Registers and combinatorial control logic used for updating these values are not shown for ease of illustration. However, a further description of one embodiment of update logic is provided later. In another embodiment, one counter 250*a* may be used to send a time base value to both processing cores 130*a*-130*b*. In yet another embodiment, the local time base counters may be located within a processing core. In a further embodiment, the synchronization logic block 240 and update logic is also located within a processing core.

Figure 3:
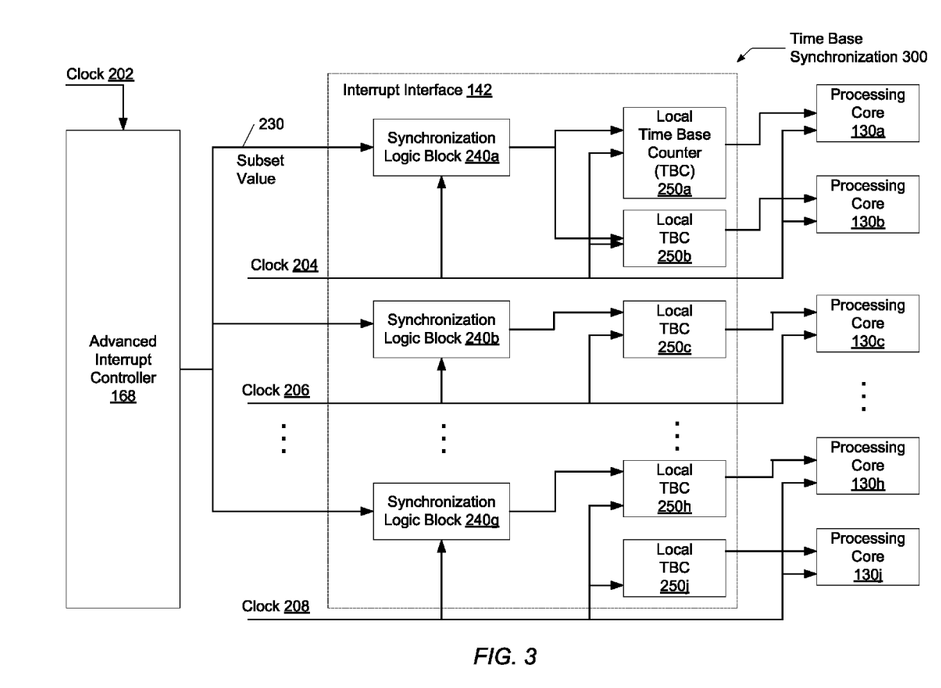
FIG. 3 is a generalized block diagram illustrating another embodiment of time base synchronization.

Referring now to FIG. 3, a generalized block diagram illustrating another embodiment of time base synchronization 300 is shown. The AIC 168 sends a subset of bits 230 to the interrupt interface 142. Here, the interrupt interface 142 includes synchronization logic blocks 240*a*-240*g* and local time base counters 250*a*-250*j* for processing cores using different clock frequencies. In one embodiment, the clock signals 204, 206, 208 and other clocks not shown being received by interrupt interface 142 each have a different clock frequency. In another embodiment, two or more of the clock signals 204, 206, 208 and other clocks not shown being received by interrupt interface 142 have a same clock frequency. However, the capacitive loading of wire routes and gates within the processing cores may exceed a given threshold. Therefore, multiple copies of the synchronization logic block 240 and local time base counters may be used to provide associated processing cores with local time base values synchronized with the main time base counter 210 in the AIC 168.

The synchronization logic blocks 240*a*-240*g* receive the subset of bits 230 and provide a synchronized, decoded and updated time base value to the local time base counters 250*a*-250*j*. The synchronization performed by each of the synchronization logic blocks 240*a*-240*g* may be dependent on a received one of the clock signals 204-208. The local time base counters 250*a*-250*j* are updated with the received time base values and continue incrementing based on a received one of the clock signals 204-208. The processing cores 130*a*-130*j* receive local time base values from the counters 250*a*-250*j*. The received local time based values are synchronized with the main time base counter 210 within the AIC 168.

Figure 4:
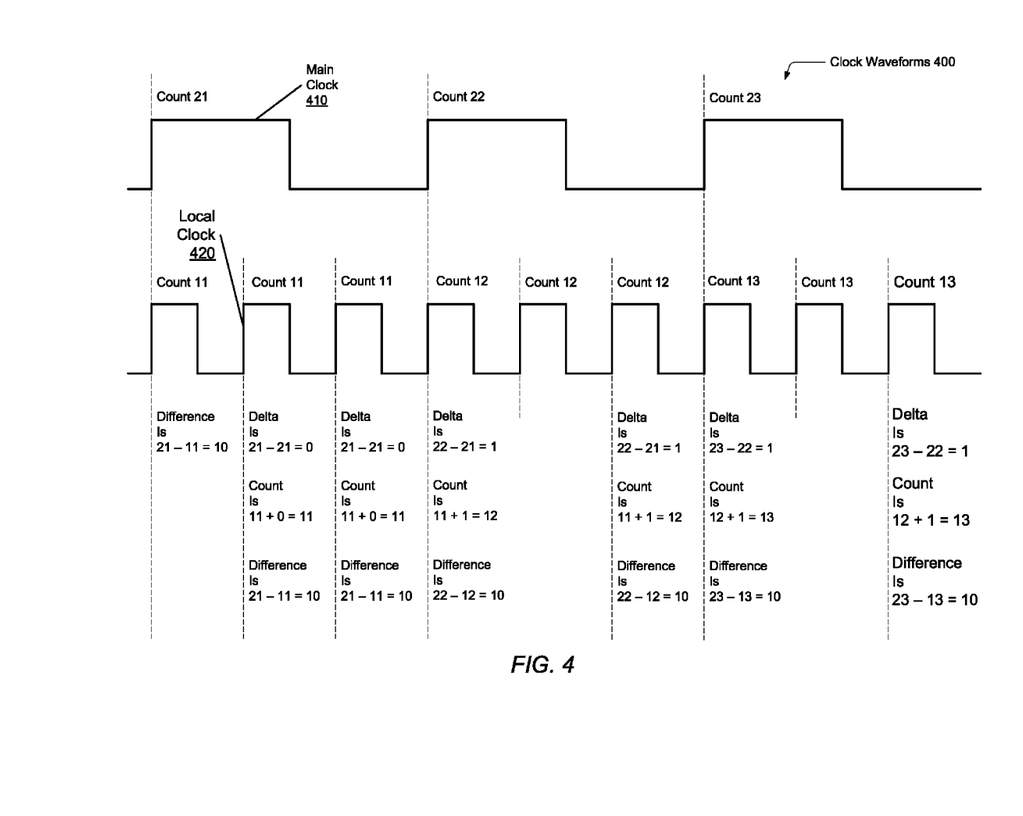
FIG. 4 is a generalized block diagram illustrating one embodiment of clock waveforms used for time base counter updates.

Turning now to FIG. 4, a generalized block diagram illustrating one embodiment of clock waveforms 400 is shown. The main clock waveform 410 may be used for timing paths within the AIC 168. The main time base counter 210 may utilize the main clock waveform 410. The local clock waveform 420 may be used for timing paths within the interrupt interface 142 and one or more of the processing cores 130*a*-130*j*. Therefore, a local time base counter may be updated at a faster rate than the main time base counter.

As can be seen in the illustrated embodiment, the local clock waveform 420 is three times faster than the main clock waveform 410. The main time base counter 210 and a local time base counter, such as counter 250*a* shown in previous figures, may be reset in a synchronous manner. However, the respective count values may not be the same. A difference between their values may exist. The counters however may be synchronized as long as the difference remains a constant. For example, in the illustrated embodiment, the main time base counter 210 has a count value of 21 during the first shown cycle of waveform 410. The local time base counter has a count value of 11 during the first shown cycle of waveform 420. The difference is 10.

During the second cycle of the waveform 420, a delta value may be determined to be a difference between a current value of the main time base count and a most-recent previously stored value. At this moment in time, both values are 21 and the delta value is 0. The count value for the local time base counter may be updated with the delta value. In this case, the delta value is added to the current count value. Since the delta value is 0, the local count value remains the same. In addition, the difference between the local time base value and the main time base value remains the same. During the third cycle of the waveform 420, a similar analysis is performed and the results are the same as for the second cycle.

During the fourth cycle of the waveform 420, the main time base value is incremented from 21 to 22. In this example, the synchronization logic block 240 immediately detects this change. However, this example is simplified to demonstrate the analysis. In a design with integrated circuits, a subset of the updated main time base value may be encoded, stored in a register, and sent via wire routes and one or more other storage elements to the synchronization logic block 240. The received subset of bits may be synchronized, decoded and possibly stored in a register before being used to update a local time base counter.

Continuing with the above example when the fourth cycle of the waveform 420 is reached, the delta value may be determined to be 1. The difference between the current main time base value and a most-recent, previously stored value is 1. As described above, the local time base value may be updated with the delta value. The delta value may be added to the current count value. Since the delta value is 1, the local count value increments from 11 to 12. The difference between the local time base value and the main time base value remains the same. The analysis and update described above repeats for the subsequent clock cycles for both waveforms 410 and 420.

Figure 5:
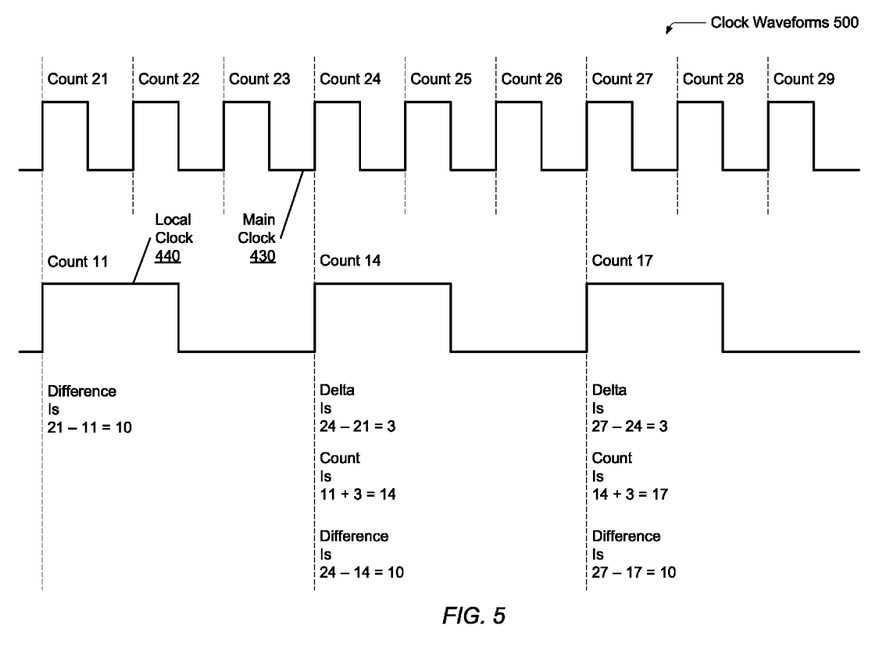
FIG. 5 is a generalized block diagram illustrating another embodiment of clock waveforms used for time base counter updates.

Turning now to FIG. 5, a generalized block diagram illustrating one embodiment of clock waveforms 500 is shown. The main clock waveform 430 may be used for timing paths within the AIC 168. The main time base counter 210 may utilize the main clock waveform 430. The local clock waveform 440 may be used for timing paths within the interrupt interface 142 and one or more of the processing cores 130a-130j. Therefore, a local time base counter may be updated at a slower rate than the main time base counter.

As can be seen in the illustrated embodiment, the local clock waveform 440 is three times slower than the main clock waveform 430. The main time base counter 210 and a local time base counter, such as counter 250a shown in previous figures, may be reset in a synchronous manner. However, the respective count values may not be the same. The counters may be synchronized as long as a difference between their values remains a constant. Similar to the previous example described above, during the first cycle shown for each of the waveforms 430 and 440, the difference between time base values is 10.

During the second and third cycles of the waveform 430, the main time base counter 210 is incremented to 22 and 23, respectively. The local time base counter 250a is not ready for an update due to the slower clock waveform 440. During the fourth cycle of the waveform 430, the delta value may be determined to be 3. Again, the delta value is the difference between the current main time base value and a most-recent, previously stored value. The local time base value may be updated with the delta value. The delta value may be added to the current local time base value. Since the delta value is 3, the local count value increments from 11 to 14. The difference between the local time base value and the main time base value remains the same. The analysis and update described here repeats for the subsequent clock cycles for both waveforms 430 and 440.

Figure 6:
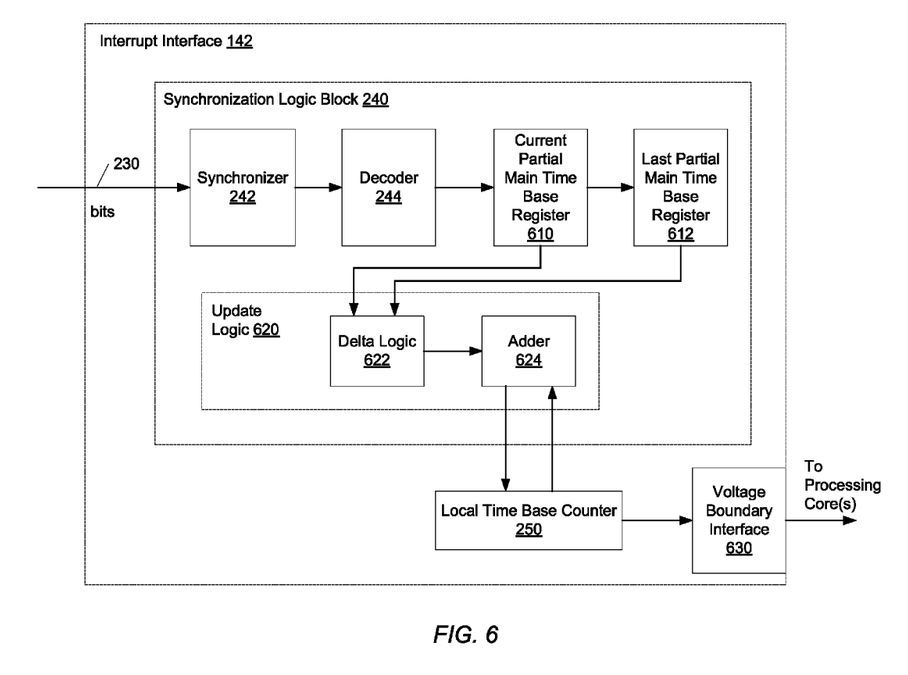
FIG. 6 is a generalized flow diagram illustrating another embodiment of an interrupt interface.

Referring now to FIG. 6, a generalized block diagram illustrating another embodiment of the interrupt interface 142 is shown. The AIC 168 sends a subset of bits 230 to the interrupt interface 142. As described earlier, the synchronization logic block 240 includes a synchronizer 242 and a decoder 244. In addition, the block 240 may include registers 610 and 612 to store current and previously received versions of the synchronized and decoded subset of bits 230. The outputs of the registers 610 and 612 may be received by delta logic 622 within the update logic 620.

The update logic 620 may provide an updated value for the local time base value based upon detected changes in the received subset of bits 230. The delta logic 622 may find a difference between the stored values in the registers 610 and 612. The update logic 620 may include an adder 624 for adding the output of the delta logic 622 to the current local time base value stored in the local time base counter 250. The update logic 620 may perform the analysis shown in both FIG. 4 and FIG. 5. The voltage boundary interface 630 may adjust the voltage levels of signals sent from the local time base counter 250 to one or more of the processing cores 130a-130j. One or more of the processing cores 130a-130j may utilize a different operating voltage than one used by the interrupt interface 142.

Figure 7:
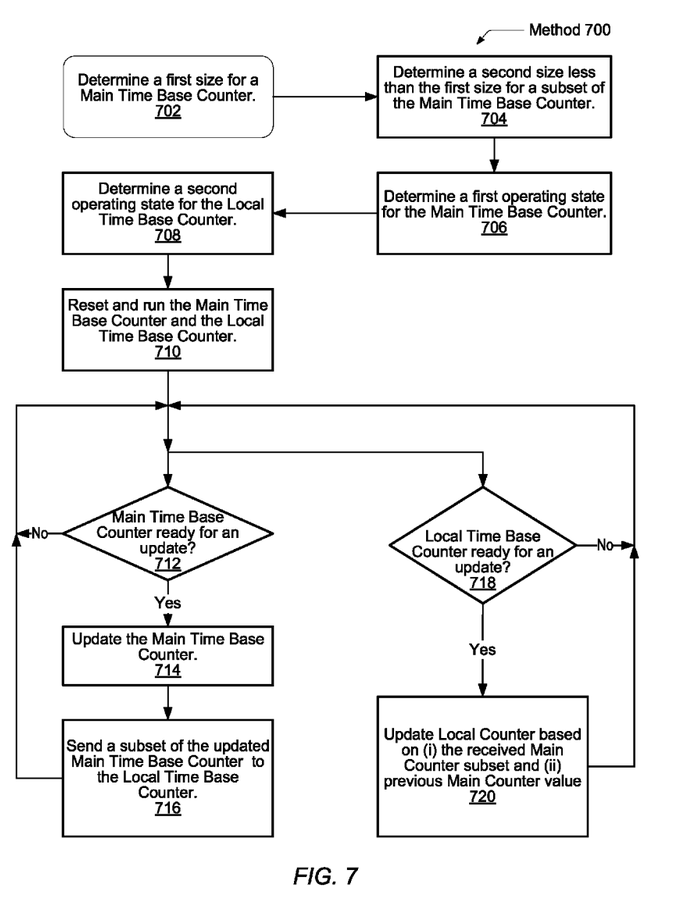
FIG. 7 is a generalized flow diagram illustrating one embodiment of a method for synchronizing time base values on a SOC.

Turning now to FIG. 7, a generalized flow diagram illustrating one embodiment of a method 700 for synchronizing time base values on a SOC is shown. For purposes of discussion, the steps in this embodiment are shown in sequential order. However, some steps may occur in a different order than shown, some steps may be performed concurrently, some steps may be combined with other steps, and some steps may be absent in another embodiment.

In block 702, a first size for a main time base counter is determined. For example, the main time base counter 210 may be a 64-bit counter. In block 704, a second size smaller than the first size may be determined for a subset of bits of the main time base counter. In one example, the subset of bits may include the least-significant 8 bits of the 64-bit main time base value.

In block 706, a first operating state for the main time base counter may be determined. The operating state may include at least a clock frequency. In block 708, a second operating state for the local time base counter may be determined. The second operating state may be different from the first operating state. For example, a frequency for a clock used by the local time base counter may be different from a clock frequency used by the main time base counter.

In block 710, each of the main time base counter and the local time base counter may be reset in a synchronous manner and begin running Although the time base counters are reset in a synchronous manner, there may be a difference between their values. As long as this difference is a constant, the time base counters are synchronized.

In one embodiment, each of the time base counters may be ready for an update when a given edge of a respective clock arrives. The time base counters may be updated with a rising or a falling edge of a respective clock. If the main time base counter is ready for an update (conditional block 712), then in block 714, the main time base counter may be incremented. In block 716, a subset of bits of the updated main time base value may be sent to logic for updating the local time base counter. In one embodiment, this subset of bits is encoded prior to being transmitted.

If the local time base counter is ready for an update (conditional block 718), then in block 720, the local time base counter is updated. Update logic for the local time base counter may utilize (i) the received main time base counter subset of bits and (ii) both main and local time base counter values used during a last update. The update logic may perform analysis similar to the computations shown in the illustrated embodiments in each of FIG. 3 and FIG. 4.

Figure 8:
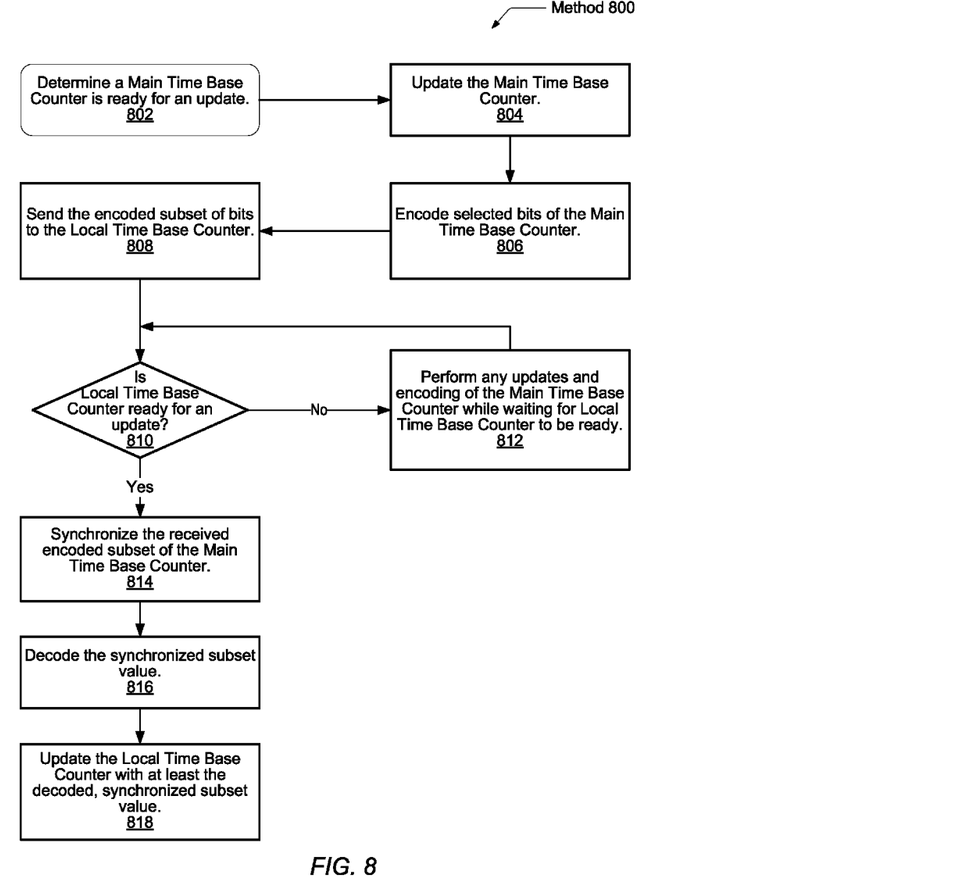
FIG. 8 is a generalized flow diagram illustrating one embodiment of a method for updating time base counters in a synchronous manner.

Referring now to FIG. 8, a generalized flow diagram illustrating one embodiment of a method 800 for updating time base counters in a synchronous manner is shown. For purposes of discussion, the steps in this embodiment are shown in sequential order. However, some steps may occur in a different order than shown, some steps may be performed concurrently, some steps may be combined with other steps, and some steps may be absent in another embodiment.

In block 802, a main time base counter is determined to be ready for an update. In block 804, the main time base counter is updated, such as being incremented. In block 806, a subset of the updated main time base counter is encoded. The subset may include a number of least-significant bits of the main time base counter, which is less than the total number of bits for the counter. The Gray code or other code may be used for encoding the subset of bits.

In block 808, the encoded subset may be sent to update logic for a local time base counter. If the local time base counter is not ready for an update (conditional block 810), then in block 812, further updates of the main time base counter may occur when the main time base counter is ready. For each update, a subset of bits may be encoded and transmitted.

If the local time base counter is ready for an update (conditional block 810), then in block 814, the received encoded subset of bits may be synchronized with the local time base counter. For example, one or more registers utilizing a same clock frequency as the local time base counter may store the encoded subset of bits. In block 816, the subset of bits may be decoded. In block 818, the local time base counter may be updated based on the decoded subset of bits.

Figure 9:
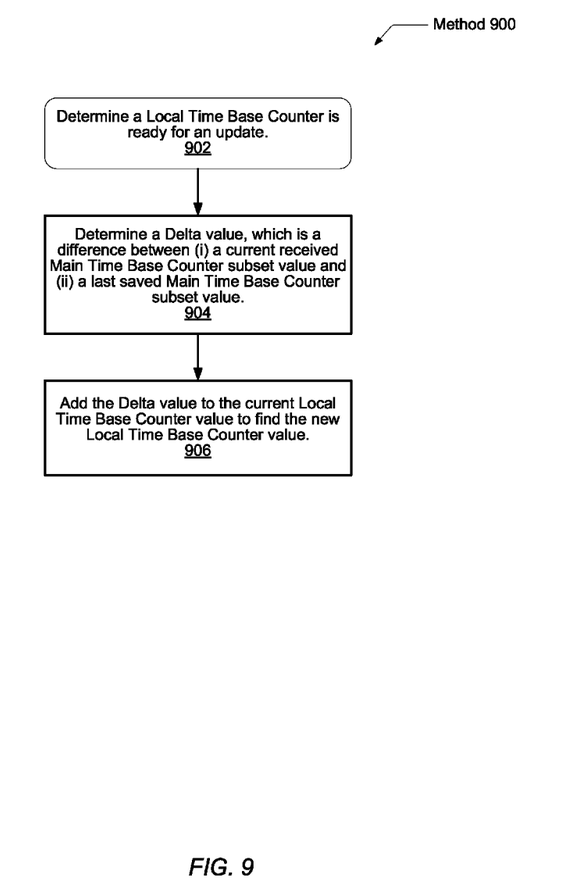
FIG. 9 is a generalized flow diagram illustrating one embodiment of a method for updating a local time base counter.

Turning now to FIG. 9, a generalized flow diagram illustrating one embodiment of a method 900 for updating a local time base counter is shown. For purposes of discussion, the steps in this embodiment are shown in sequential order. However, some steps may occur in a different order than shown, some steps may be performed concurrently, some steps may be combined with other steps, and some steps may be absent in another embodiment.

In block 902, a local time base counter is determined to be ready for an update. In block 904, a delta value may be determined. The delta value may be a difference between (i) a current received subset of bits of a main time base counter and (ii) a most-recent, previously stored subset of bits. For example, if the a current received subset of bits is 27 and a most-recent, previously stored subset of bits is 24, then the delta value is 3. In block 906, the delta value may be added to the current local time base counter to provide a new local time base counter value.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
receiving a subset of bits of a main counter comprising a first number of bits, wherein the subset of bits represents fewer than all of the first number of bits;
determining a difference between a first value represented by the subset of bits and a second value represented by a previously received subset of bits of the main counter;
updating one or more local counters according to said difference, wherein said updating comprises adding the difference to a current local counter value to produce a new local counter value, and wherein each of the local counters is coupled to an associated processing core.

2. The method as recited in claim 1, wherein the main counter is a time base counter for a system-on-a-chip (SOC).

3. The method as recited in claim 2, further comprising utilizing a different clock frequency for the main counter than a clock frequency for the one or more local counters.

4. The method as recited in claim 3, further comprising maintaining a constant difference between an updated local counter and a current main counter value at each time of updating the local counter.

5. The method as recited in claim 3, wherein the subset of bits includes N bits, and wherein a clock frequency of core associated with a local counter is no slower than $2^N$ times slower than the clock frequency of the main counter.

6. The method as recited in claim 4, further comprising resetting the main counter and each of the one or more local counters in a synchronized manner.

7. The method as recited in claim 2, further comprising determining each of the one or more associated local counters is ready for an update.

8. The method as recited in claim 1, wherein the received subset of bits comprise an encoded version of selected bits of the main counter.

9. A system-on-a-chip (SOC) comprising:
a controller including a main counter comprising a first number of bits;
a plurality of processing cores;
one or more synchronization logic blocks; and
a plurality of local counters, each coupled to one of the plurality of synchronization logic blocks and a respective one of the plurality of processing cores;
wherein the controller is configured to convey a subset of bits, wherein the subset of bits represents a second number of least significant bits of the main counter, wherein the second number is less than the first number; and
wherein each of the synchronization logic blocks is configured to update an associated local counter of the plurality of local counters according to at least changes represented by the received subset of bits, wherein said update comprises adding a difference between a first value represented by the subset of bits and a second value represented by a previously received subset of bits of the main counter to a current local counter value to produce a new local counter value.

10. The SOC as recited in claim 9, wherein the main counter is a time base counter for the SOC.

11. The SOC as recited in claim 10, wherein the main counter uses a different clock frequency than one or more of the local counters.

12. The SOC as recited in claim 11, wherein each of the synchronization logic blocks is configured to perform said update in response to the determining each of one or more local counters is ready for an update.

13. The SOC as recited in claim 12, wherein each of the subset of bits is encoded and each of the synchronization logic blocks is further configured to decode the subset of bits prior to updating one or more associated local counters.

14. The SOC as recited in claim 12, wherein determining a given one of the plurality of local counters is ready for an update comprises detecting an associated enable signal indicates an update is able to occur.

15. The SOC as recited in claim 14, wherein each of the synchronization logic blocks is further configured to disable for one or more local clock cycles an update of one or more associated local counters when a clock frequency of the local counter is faster than a clock frequency of the main counter.

16. A synchronization logic block comprising:
 a first interface configured to receive a subset of bits from a controller including a main counter comprising a first number of bits, wherein the subset of bits represents a second number of least significant bits of the main counter, wherein the second number is less than the first number;
 a second interface coupled to one or more local counters, wherein each of the local counters is coupled to an associated processing core; and
 control logic, wherein the control logic is configured to update the one or more local counters according to changes represented by the received subset of bits, wherein to perform said update the control logic is configured to determine a delta value, wherein the delta value is a difference between a currently received subset of bits and a previously received subset of bits, and add the delta value to a current local counter value to produce a new local counter value.

17. The synchronization logic block as recited in claim 16, wherein the main counter is a time base counter for a system-on-a-chip (SOC).

18. The synchronization logic block as recited in claim 17, wherein the control logic is further configured to perform said update in response to determining each of the one or more local counters is ready for an update.

19. The synchronization logic block as recited in claim 17, wherein the control logic is further configured to disable for one or more local clock cycles an update of one or more associated local counters.

20. A processor within a system-on-a-chip (SOC) comprising:
 a first interface configured to receive a subset of bits of a main counter comprising a first number of bits, wherein the subset of bits represents fewer than all of the first number of bits;
 a local counter; and
 a synchronization logic block, wherein the synchronization logic block is configured to update the local counter according to changes in a count represented by the received subset of bits, wherein to perform the update the synchronization logic block is configured to determine a delta value, wherein the delta value is a difference between a current count of the main counter and a previous count of the main counter, and add the delta value to a current local counter value to produce a new local counter value.

21. The processor as recited in claim 20, wherein the main counter is a time base counter for the SOC.

22. The processor as recited in claim 21, wherein the local counter and the synchronization logic block use a different clock frequency than the main counter in the interrupt controller.

23. The processor as recited in claim 21, wherein the synchronization logic block is further configured to disable an update of the local counter for one or more local clock cycles.

24. The processor as recited in claim 21, wherein the synchronization logic block is further configured to
 determine the local counter is ready for an update.

* * * * *